Feb. 22, 1949.  E. R. BOOTS  2,462,603
THREADED LOCKING DEVICE
Filed March 1, 1945  2 Sheets-Sheet 1
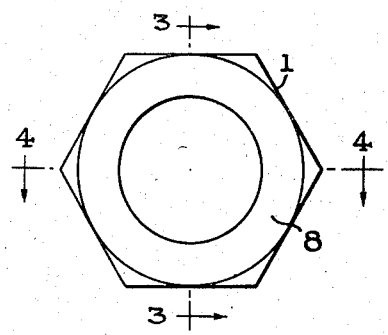
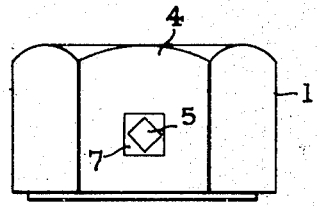
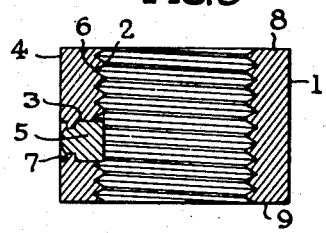
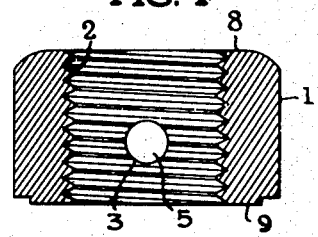
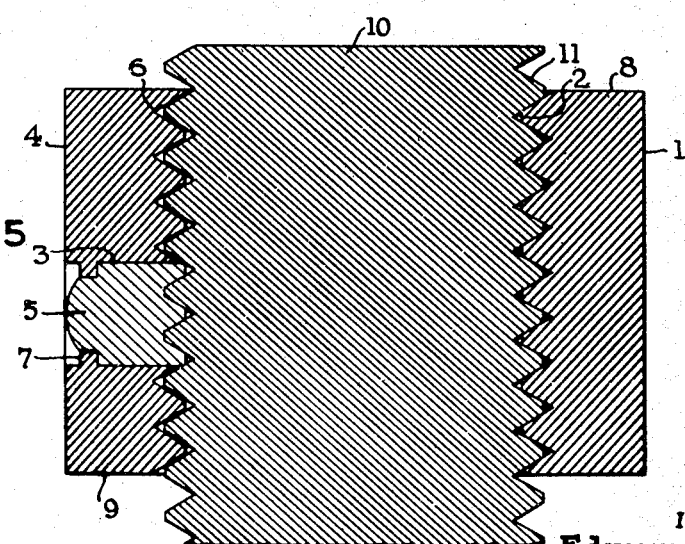
INVENTOR.
Edmund R. Boots
BY
George T. Gill
Attorney Feb. 22, 1949.    E. R. BOOTS    2,462,603
THREADED LOCKING DEVICE
Filed March 1, 1945    2 Sheets—Sheet 2

INVENTOR.
EDMUND R. BOOTS
BY George T. Gill
ATTORNEY

Patented Feb. 22, 1949

2,462,603

UNITED STATES PATENT OFFICE 2,462,603

THREADED LOCKING DEVICE

Edmund R. Boots, Short Hills, N. J., assignor to The Nylok Corporation, New York, N. Y., a corporation of Delaware Application March 1, 1945, Serial No. 580,387

2 Claims. (Cl. 151—7)

The invention herein disclosed relates to a threaded locking device of the kind in which a surface engagement is effected between the thread thereof and the thread of a mating threaded element to produce a frictional force between the threads thereof of a magnitude sufficient to resist relative rotation thereof under forces resulting from vibration and shock ordinarily encountered in service.

Due to the tolerances necessary for the commercial production of threaded elements, such for example as nuts and bolts, the surfaces of the thread of nut and the thread of a bolt come into pressure contact only when the nut is drawn home against a member to be secured. Various forms of so-called self-locking nuts have been devised to effect a frictional engagement between the thread thereof and the theard of a bolt to produce a restraining action sufficient to resist relative rotation of the nut and bolt under forces resulting from vibration and shock. In some instances, a distortion of a portion of the thread of the nut is effected to produce a clamping action. In other instances, resilient arrangements are utilized to effect a gripping action or to effect an axial displacement to bring the surface of the thread of the nut into engagement with the thread of the bolt.

In accordance with this invention, a threaded element has associated therewith a means for producing axial misalignment between it and a mating threaded element, whereby intimate contact is effected between the threads over a portion of the mating threaded elements. In this manner, the thread tolerance is taken up by the means for effecting axial misalignment and the engaging thread surfaces of the mating threaded elements are, for a portion thereof, in intimate, surface and frictional contact. Desirably, the means for effecting axial misalignment between the threaded locking device and the mating threaded element has a certain amount of resilience or elasticity and may consist of a non-metallic, elastic medium retained within a recess extending from the thread.

A self-locking nut embodying the invention, is illustrated in the accompanying drawing and described in detail below, from which description a clearer understanding of the invention may be had.

Figure 1:
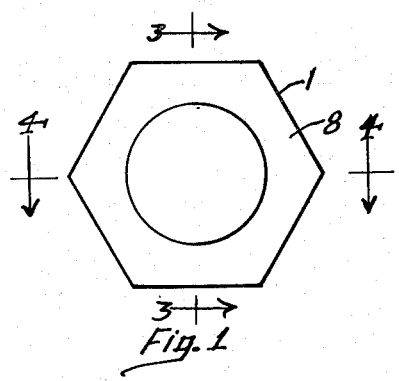
Figure 2:
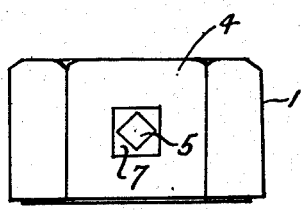
Figure 3:
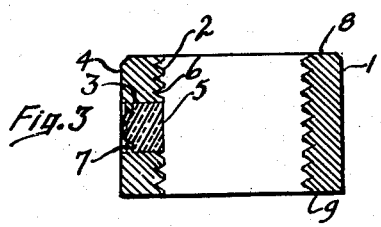
Figure 4:
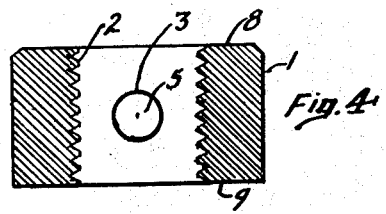
Figure 5:
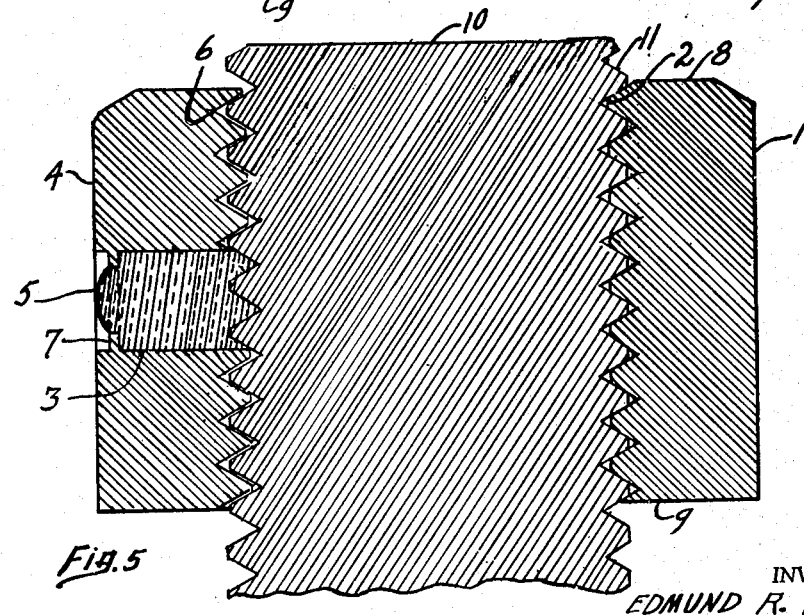

The drawings include:

Fig. 1 which is a plan of a nut embodying the invention;

Fig. 2 which is a side elevation of the same;

Fig. 3 which is a sectional elevation of the same taken on the line 3—3 of Fig. 1;

Fig. 4 which is a sectional elevation of the same taken on the line 4—4 of Fig. 1; and Fig. 5 which is a sectional elevation similar to Fig. 3 on a greatly enlarged scale and illustrating the action of the resilient insert.

In general, the threaded locking devices illustrated in the drawing include a metallic body having a thread and a hole extending from the thread, desirably radially, and a resilient medium within the hole. The resilient medium extends to a point at least beyond the root of the thread. In this way, it engages the thread of a mating threaded element and resiliently acts thereon transversely of the axis thereof to bring the threads into intimate surface contact. A frictional force is thus created between the threads of the mating threaded elements that is sufficient to resist relative rotation thereof under forces acting thereon due to vibration and shock ordinarily encountered in service.

The nut illustrated in Figs. 1 to 5 is, except for the modifications hereinafter described, an ordinary hex nut and consists of a bored nut body I having an internal thread 2. The thread is the ordinary V-shaped thread having an angle of sixty degrees. A circular hole 3, extends from the thread radially of the axis of the nut. This hole is readily formed by drilling the nut, radially, through one side face 4 thereof. After the hole is drilled, a wedge or plug 5 of an elastic or resilient medium is inserted in the hole and extends to a point beyond the root 6 of the thread 2. Desirably, the plug 4 makes a tight fit in the hole and a staking tool is used to form a flange 7 adjacent the radially outer end of the hole. This flange backs up the plug and restrains it against movement in a direction away from the thread.

Various elastic or resilient mediums may be used for the plug. An especially efficacious material is the thermoplastic known by the trademark "Nylon." By the term "Nylon" is meant certain polyamides derived from polyamide-forming materials of the class consisting of aminocarboxylic acids and mixtures of polyamines with polycarboxylic acids. Polyamides particularly suitable for the present purposes include polyhexamethylene adipamide, polyhexamethylene sezacamide, polyepsilonaminocaproamide, polytetramethylene adipamide, polyhexamethylene terephthalamide, and mixtures of these polyamides. Particularly valuable are the synthetic linear polyamides melting at comparatively high temperatures, above one hundred degrees centigrade. With this material it has been found that the plug, when circular in end elevation is desirably of a diameter greater than the pitch of the thread and preferably equal to the distance longitudinally of the nut of approximately two and one-half thread convolutions. The hole and, in consequence, the plug 5 are located at the transverse center of the nut, equidistant from the end faces 8 and 9.

When the nut is threaded on a bolt, such as the bolt 10, the thread of the bolt compresses the elastic plug, embossing its thread therein. As the plug is confined, it resiliently resists the compressive action and effects a force acting between the nut and the bolt and transverse to the axis thereof. The result is that the thread 11 of the bolt 10 and the thread 2 of the nut are wedged together over at least one hundred and eighty degrees, that is on one side, the side opposite the plug, of an axial diametrical plane to which the axis of the hole 3 is normal. This portion of surfaces of the engaging threads 11 and 2 are thus maintained, over substantially one hundred and eighty degrees, in intimate, frictional contact as seen at the right in Fig. 5. This frictional engagement of the surfaces of the threads is sufficient to resist relative rotation of the nut and the bolt due to forces acting thereon and resulting from vibration and shock ordinarily encountered in service.

The invention is readily applied to the ordinary nuts available on the market. It is only necessary to provide the hole and assemble the plug in the hole. The arrangement provides an effective self-locking nut with but small added cost over a plain nut or bolt and irrespective of the thread classification. In addition, the appearance of the nut and bolt remains the same and the elastic element is equally effective no matter which end of the nut is threaded on the bolt.

While a single, radially extended insert substantially midway of the mating threads has been found to be effective and has been described as the preferred embodiment, other arrangements are also effective. For example, inserts inclined at an acute angle to the axis may be used, two or more inserts may be provided angularly or longitudinally disposed, and the insert need not be midway of the mating threads. It appears that the effect is attained by disturbing the axial coincidence of the mating threaded elements, either by effecting a shifting of the axis while maintaining a parallel relation or by effecting an inclination of the axes so that a portion of the mating threads are brought into and maintained in frictional surface engaging contact.

The "Nylon" insert used in threaded locking devices, such as above described, has, in contact with the thread of the mating threaded element, a lower coefficient of friction than the coefficient of friction of the surfaces of the mating threads. By compressing the insert, the surfaces of the mating threads, having the higher coefficient of friction are brought, in part, into frictional engagement. This is effected in the arrangements described by a transverse shifting of the axes of the threaded elements. The shifting may be in a parallel relation by a force lateral to the axis or in an inclined relation by an inclined or off center force, but should be such that the force is transverse and effects, in part, a wedging of each thread between convolutions of the mating thread.

It will be obvious that various other changes may be made by those skilled in the art in the embodiments of the invention illustrated in the drawings and described in detail above within the principle and scope of the invention as expressed in the appended claims.

I claim:

1. As a new article of manufacture, a self-locking nut provided with an internal screw thread, said nut being provided with a hole extending substantially radially through one side of the nut and through the internal thread, the internal screw thread opposite said hole being continuous, a plug of resilient plastic material seated in and fitting said hole and extending into said internal screw thread, holding means on said nut engaging the outer portion only of said plug, and comprising the sole means for preventing the outward movement of said plug, said plug being adapted to be pressed by the thread of the bolt when it is applied to the bolt, to be forced against said holding means, the reactive force of said pressure serving to force the nut and bolt in opposite directions laterally so that the nut and bolt threads opposite said plug are forced into tight frictional engagement.

2. The combination as set forth in claim 1, wherein the plug of resilient plastic material is made of a synthetic linear polyamide known commercially as "Nylon."

EDMUND R. BOOTS.

REFERENCES CITED

The following references are of record in the file of this patent:

UNITED STATES PATENTS

| Number | Name | Date |
|---|---|---|
| 230,009 | Harding | July 13, 1880 |
| 250,448 | Little | Dec. 6, 1881 |
| 298,843 | Gissinger | May 20, 1884 |
| 299,447 | Williams | May 27, 1884 |
| 329,547 | Goodrich | Nov. 3, 1885 |
| 464,568 | Johnson | Dec. 8, 1891 |
| 664,954 | Kline | Jan. 1, 1901 |
| 715,270 | Karns | Dec. 9, 1902 |
| 1,204,695 | Scharmann | Nov. 14, 1916 |
| 2,255,948 | Swanstrom | Sept. 16, 1941 |
| 2,360,531 | Wojtan | Oct. 17, 1944 |
| 2,390,759 | Warren | Dec. 11, 1945 |
| 2,401,824 | Gladden | June 11, 1946 |
| 2,450,694 | Saner | Oct. 5, 1948 |

FOREIGN PATENTS

| Number | Country | Date |
|---|---|---|
| 372,405 | Great Britain | May 9, 1932 |
| 495,195 | Great Britain | Nov. 8, 1938 |
| 504,853 | Great Britain | May 2, 1939 |
| 9,017 | Great Britain | Apr. 11, 1911 |

Certificate of Correction

Patent No. 2,462,603 — February 22, 1949

EDMUND R. BOOTS

It is hereby certified that errors appear in the above numbered patent requiring correction as follows:

Strike out Sheet 2 of the drawings; in the heading to Sheet 1, line 3, strike out "2 Sheets—Sheet 1";

and that the said Letters Patent should be read with these corrections therein that the same may conform to the record of the case in the Patent Office.

Signed and sealed this 8th day of August, A. D. 1950.

[SEAL]

THOMAS F. MURPHY,
*Assistant Commissioner of Patents.*